2,939,470

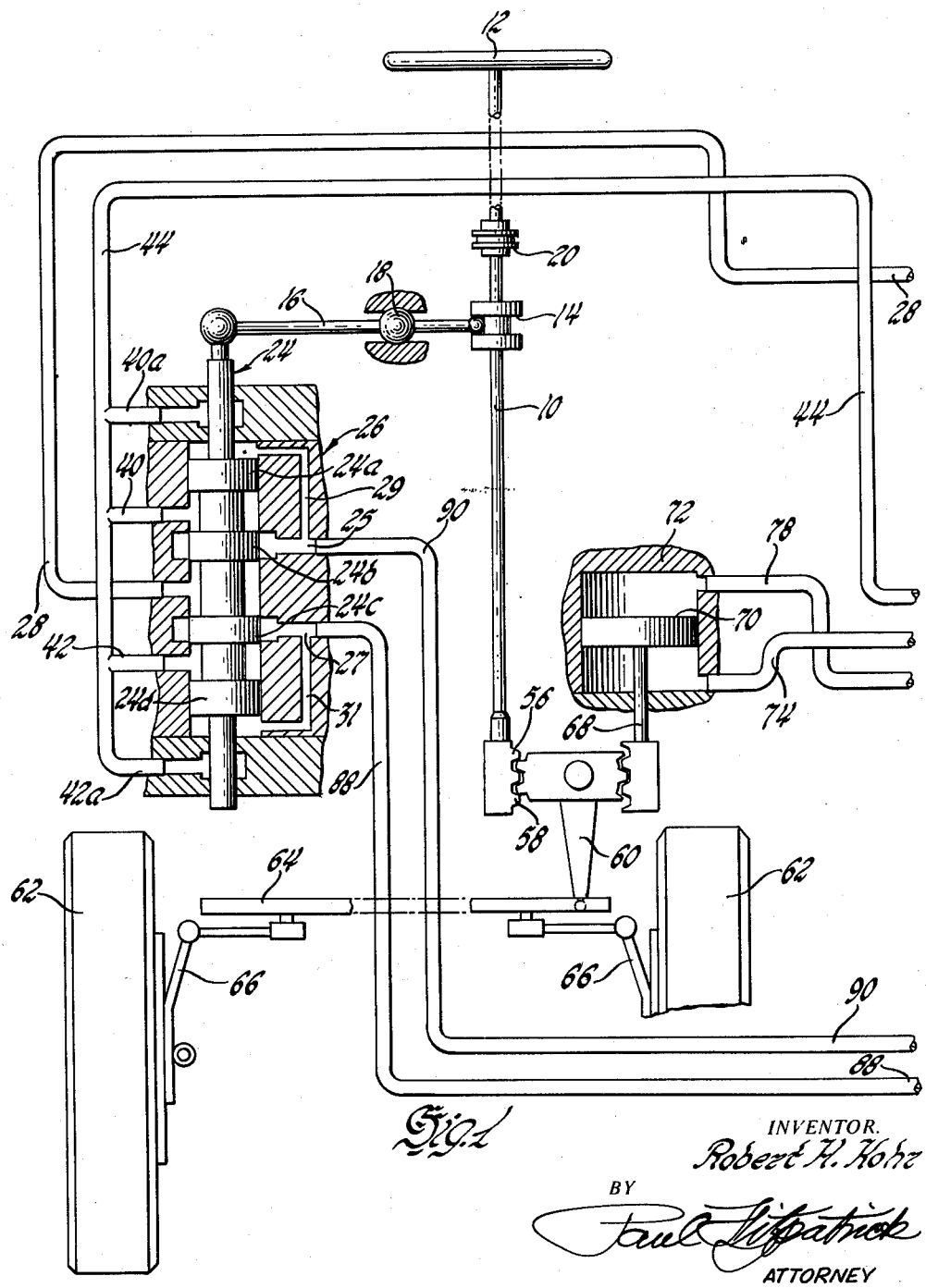

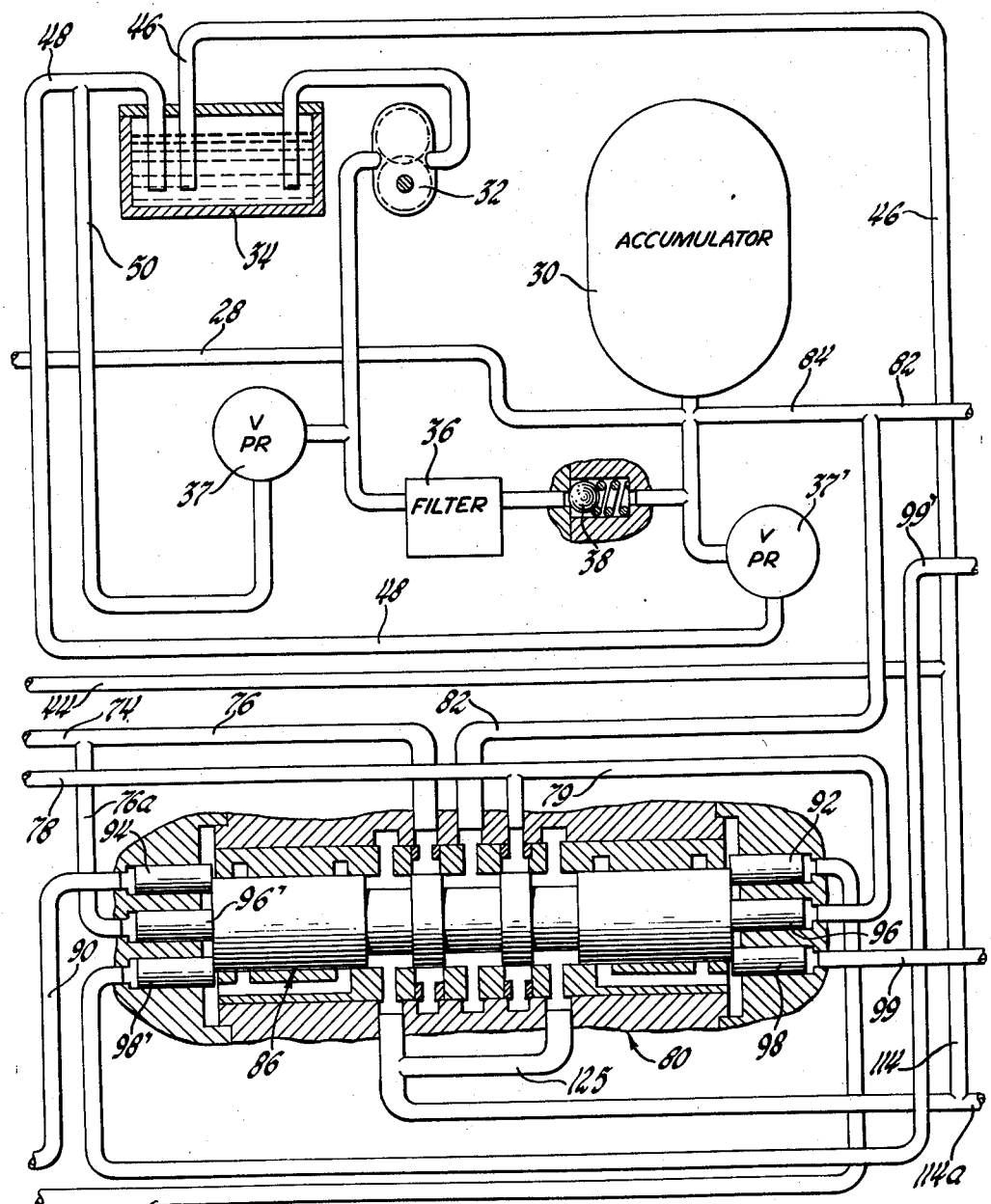

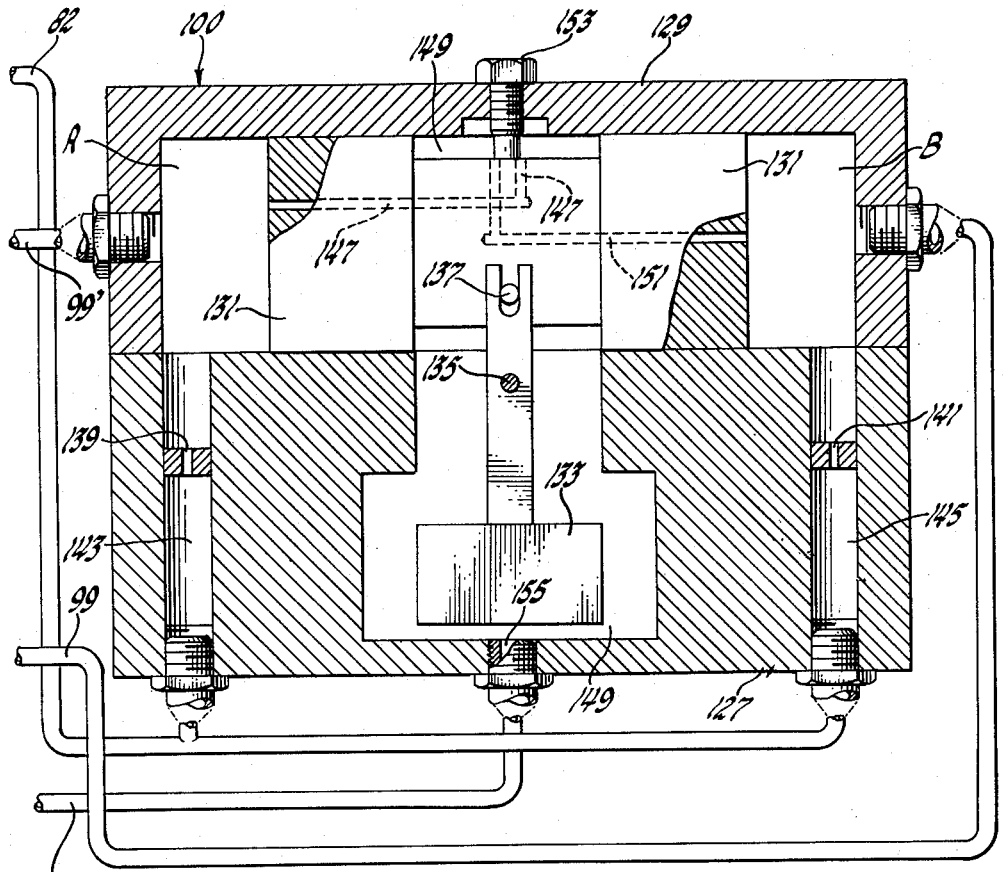
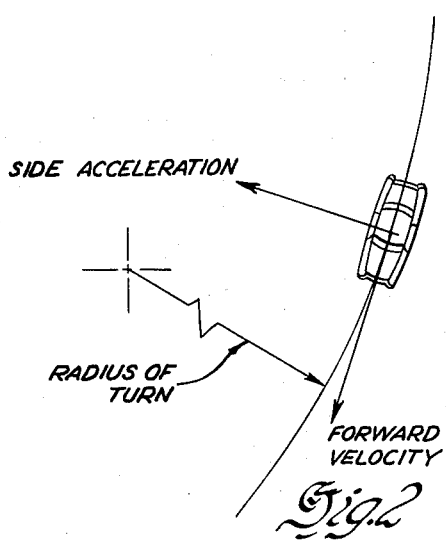

United States Patent Office
Patented June 7, 1960

2,939,470

AUTOMOTIVE VEHICLE HAVING FREE CONTROL AND STABILITY FEATURES

Robert H. Kohr, Royal Oak, Mich., assignor to General Motors Corporation, Detroit, Mich., a corporation of Delaware Filed Nov. 29, 1957, Ser. No. 699,592

4 Claims. (Cl. 137—45)

This invention concerns automotive vehicles and more especially relates to improvements in the steering and handling characteristics of such vehicles, particularly when equipped with power steering apparatus.

It is generally recognized among automotive engineers that the operator of an automotive vehicle steers, in part, by "feel" derived through his hands at the steering wheel and, in part, through visual observation of differences between course heading and desired heading of the vehicle.

Driving skill is perhaps best measured in terms of the speed with which the individual reacts and responds to changing conditions affecting vehicle heading. Using this test, it is manifest on the basis of empirical observation alone, that the variation in driving skill among drivers as a whole, or for that matter among drivers in any selected group, excepting possibly experienced test and racing drivers, is very substantial indeed. Clearly, if some means could be found which would operate, in effect, to quicken the receptivity and responsiveness of the driver, whatever his inherent skill, the result would be highly beneficial.

The present invention aims to provide such means by feeding to the driver at the steering wheel force reactions not hitherto sensed in motor vehicle operation.

A further object is to provide steering control means which tend to keep the vehicle on a straight course, i.e. to reduce lateral acceleration of the vehicle to zero.

Another and more specific object of the invention is to provide a system of apparatus for application to a power steered vehicle, which apparatus in operation modulates the action of the power steering control means to achieve the results sought.

There are two conditions of motor vehicle operation which particularly illustrate the need for this invention. The first is the incipient skid condition where the rear wheels of the vehicle are tending to break away, and the second is that obtaining when the vehicle encounters a strong, sudden, transverse wind gust. In the former case, the road forces normally sensed at the steering wheel as "feel" tend to disappear leaving the driver with no front wheel position information, and in the latter case the road load on the front wheels develops too late for the driver to make the necessary steering correction. The present invention answers fully to both of these conditions. Thus, in either case it immediately indicates to the driver through the steering wheel the direction the dirigible wheels are turned, permitting the speediest possible recovery.

The free-control (hands-off) stability of the vehicle is markedly improved by the present invention. Indeed, in certain emergency situations, as a skid on ice, it is not infrequently best that the steering wheel be released entirely so that the vehicle will be permitted to straighten up automatically.

The modulation of the power steering control means to attain the desired effects is accomplished according to the invention by hydro-mechanical means incorporated in a system otherwise particularly characterized in that the actuation of the power steering control means is effected by fluid pressure.

A preferred embodiment of the invention is illustrated by the accompanying drawings which will be referred to in the further description and in which:

Figures 1, 1a, and 1b collectively illustrate a system wherein the power for steering is provided by a hydraulic motor under the control of a spool type valve and wheremotor under the control of a spool type valve and wherein the modulation of the valve according to the invention is achieved by an accelerometer of a particular type; and Figure 2 illustrates forces acting upon a vehicle in the negotiation of a right turn, the radius of which remains constant.

Referring first to Figure 1, the numeral 10 indicates a steering shaft carrying the usual steering wheel 12 at its upper end. The shaft is enlarged and annularly grooved at 14 to accommodate the end of a lever 16 fulcrumed at 18. Thus, on axial movement of the shaft, induced by steering reaction as later explained, lever 16 will rotate on its pivot in a direction determined by the direction of axial movement of the shaft.

A coupling 20 serves to take care of any alignment problems and may be so designed that the reactionary axial movement of the shaft 10 is limited to the portion thereof below the coupling.

Lever 16 will be seen as connected at its end opposite the portion 14 with the spool component 24 of a torque valve 26. Such valve is suitably ported to receive pressure fluid via a line 28 from an accumulator 30 (Fig. 1a) served by a pump 32 drawing from a reservoir 34. The pump may be powered from the crankshaft of the engine of the vehicle, for example. Filter 36 and relief valves 37, 37' serve an obvious purpose, while ball check valve 38, which is loaded in a direction toward the pump, as by a spring, operates to block the flow of fluid from the pump discharge line except during the accumulator loading cycle.

Pump 32 may be either a constant or variable displacement pump. In the event a constant displacement pump is used a suitable by-pass mechanism should be employed appropriately controlled by discharge pressure, so that with the ball 38 seated the suction and discharge sides of the pump are interconnected. Pumps so equipped are well known and hence nothing further in point needs to be stated here.

Reverting to the torque valve 26, it will be seen that the same comprises in addition to the pressure port communicating with the line 28 a pair of exhaust ports corresponding to lines 40, 42 connecting with the return line 44 to the sump or reservoir 34 via line 46 (Fig. 1a). Sump 34 on occasion may also receive fluid from the relief valves 37, 37' via lines 48 and 50, respectively.

The spool 24 of the torque valve comprises four lands 24a, 24b, 24c, and 24d. Lands 24b and 24c control the flow of pressure fluid to the outlet ports 25 and 27, while lands 24a and 24d by virtue of the passageways 29 and 31 in the valve body serve to provide a resistance to movement of the spool. Thus, should the spool 24 be displaced upwardly, a portion or the fluid flowing toward port 25 will be diverted via the passageway 29 to the chamber above the land 24a where it reacts against the land. Similarly, on downward movement of the spool 24, a portion of the fluid flowing toward the port 27 is diverted to the chamber below the land 24d via the passage 31, there to react against the latter land. Lines 40a and 42a which connect to the exhaust line 44 provide egress to fluid bleeding past the guide stems of the spool 24.

Before continuing with the description of the hydraulic circuit, the mechanical parts of the steering system beyond the steering shaft 10 should perhaps first be identified. Included among these parts is a ball nut 56, the rack teeth 58 of which provide for a suitable connection with a pitman arm 60. Such arm is shown as connected with the dirigible wheels 62 of the vehicle through a parallelogram steering linkage comprising a drag link or cross tie rod 64 and steering knuckle arms 66. The construction and modus operandi of the ball nut 56 will be made clear by reference to Hawkins Patent 2,267,425, for example.

Pitman arm 60 in addition to its connection with the ball nut, will be seen as operably connected to the shaft 68 of a power piston 70 confined within a cylinder 72. Fluid for the actuation of the piston 70 is supplied to the cylinder 72 via lines 74 and 78, communicating with lines 76 and 79 (Fig. 1a), respectively, extending to a control valve 80. This valve, which may also be designated a "summing" valve, for reasons which will subsequently become apparent, connects with the accumulator 30 via lines 82 and 84 and comprises a spool component 86 actuated by fluid under pressure, the fluid for this purpose being received from the previously mentioned torque valve 26 via lines 88 and 90. These latter lines terminate behind plungers 92 and 94, respectively, housed within the body of the control valve 80 and adapted to bear against the spool 86. It will be understood that there may be a plurality of the plungers 92 and 94 arranged so that the force applied against the spool 86 will be suitably distributed.

In addition to the plungers 92 and 94, the control valve 80 comprises a series of plungers 96, 96' and a third series of plungers 98, 98'. Plungers 96 are adapted to bear against the spool 86 to displace the same leftward by pressure fluid entering behind the plungers from line 79. Similarly plungers 96' are adapted to bear against the spool to shift the same rightward by pressure fluid admitted behind the plungers from line 76.

Pressure fluid for the actuation of the plungers 98 and 98' is derived from an accelerometer 100 (Fig. 1b) via lines 99 and 99'. This device comprises casing or body members 127 and 129 confining a slide block 131 and a pendulum 133 pivoted at 135, the pivot pin being supported by casing member 127. The pendulum will be seen slotted at its upper end to accommodate a pin 137 carried by the slide block 131. The latter with the casing members delineates two chambers A and B which are open to pressure line 82 via orifices 139 and 141, these orifices being confined within passages 143 and 145, respectively.

Slide block 131 includes a passage 147 leading from chamber A to the chamber 149 in which the pendulum is accommodated and a similar passage 151 extending from chamber B to the chamber 149. With the slide block in the position shown, a throttle or valve element 153 threaded into the casing member 129 partially covers the ports at the ends of passages 147 and 151. At the bottom of chamber 149 is a short passage 155 opening to line 114a—114 terminating at the reservoir 34.

Before describing the operation of the system of Figures 1, 1a, and 1b, it should be noted that the location of the accelerometer in the vehicle is not critical. However, it is preferred that the same be located, with the pendulum depending, of course, along the center line of the vehicle so that the pendulum swings in a plane transverse to the center line. The pendulum may be mounted under the front seat or at the bottom of the radiator support bracket, for example.

The accelerometer pendulum and all of the other parts as they appear in Fig. 1b are disposed in neutral position. Assuming a right turn, as illustrated by Fig. 2, the operator of the vehicle rotates the steering wheel 12 in the indicated direction. Due to the resistance to the turning of the dirigible wheels 62, shaft 10, or the portion thereof below the coupling 20, is caused to move axially upward. This results in downward displacement of the spool 24 of the torque valve 26 by virtue of the lever connection 16. As a consequence, pressure fluid from the accumulator 30 enters line 88 and thence passes back of the plungers 92 to shift the spool 86 of the control valve leftward (Fig. 1a). Accordingly, lines 82 and 76 become interconnected through the valve 80 causing the setting up of a pressure differential across the piston 70 in favor of the lower chamber of the cylinder 72. The upward movement of the piston 70 swings the pitman arm 60 rightward as required to power steer the dirigible wheels in the desired direction (Fig. 2).

Once lines 82 and 76 have become connected through the control valve 80, continued leftward movement of the spool is resisted by the pressure developing behind the plungers 96'—note branch line 76a. These plungers, in other words, tend on a right turn to re-center the spool 86 in the valve housing. Plungers 96 act similarly on a left turn.

As previously mentioned herein, the downward movement of the spool 24 is accompanied by flow of pressure fluid to the chamber below the land 24d via the passage 31. The developing pressure in such chamber tends to resist further displacement of the spool and is sensed at the steering wheel as "feel." That this feel is reflective of the actual steering resistance should be clear when it is considered that the pressure providing it corresponds to the pressure behind the plunger 92 and when it is further considered that the latter pressure must overcome the pressure behind the plunger 96' which corresponds to the pressure in the energized chamber of the power cylinder 72.

With the spool 86 of the valve 80 displaced to the left during a right turn, the upper chamber of the cylinder 72 and the chamber behind the centering plungers 96 are open to exhaust line 114—the exhaust being through the valve 80 and a branch line 125.

Taking up now the effect of the accelerometer 100 it will, of course, be immediately seen that the pendulum 133, which as carried by the car is disposed with its axis in a vertical plane, will tend to swing outward on the right turn (Fig. 2). Accordingly, slide block 131 (Fig. 1b) becomes displaced to the left. This fully closes off chamber A to the exhaust line 114a and fully opens chamber B to such line, the closing off of chamber A being a function of the throttle member 153. With chamber A prevented from exhausting, the pressure therein and in line 99' consequently increases relative to the pressure in chamber B and line 99. The developing pressure behind the plungers 98' of the control valve 80 functions as a resistance to the leftward displacement of the spool 86, this resistance being additive with respect to that provided by the centering plunger 96'. Thus, a part of the pressure behind the plunger 92 tending to hold the valve spool 86 displaced to the left is dissipated in overcoming the opposing pressure behind the plunger 98', the result being that the valve spool 86 is returned slightly rightward and the amount of fluid passing to the power cylinder via line 76, 74 for the actuation of piston 70 is reduced. Now to compensate for the consequent reduction of assistance against the road load the driver effort at 12 must manifestly increase, leading to further axial displacement of valve spool 24 via lever 16. Such additional displacement of the spool 24 allows more fluid for actuation of plungers 92, so that spool 86 is again displaced leftward to its position before the lateral acceleration disturbance.

When the vehicle is being parked or maneuvered slowly in close quarters, there is, of course, little if any swinging of the pendulum 133, hence the power steering assist is maximum for any given feel piston size (lands 24a, 24b). The maximum resistance owing to the accelerometer (or the minimum steering assist) obtains during a fast turn of small radius when it is desirable that the operator be most fully apprised of the forces tending to cause breakaway from the intended course.

There remains for discussion the action on the accelerometer as a safety contrivance and as a device for providing free control stability. In this connection, let us assume that the vehicle in Figure 2 is traveling at an excessive speed and has begun to spin. In other words, the center of turning has moved ahead of the front wheels of the vehicle and usually closer, to the right side of the vehicle. Correction of a spin in the indicated direction, of course, requires prompt turning of the dirigible wheels to the left. Since the resisting pressure set up by the accelerometer is acting in a direction tending to steer the dirigible wheels to the left, and since the force tending to maintain the pendulum displaced is magnified under the spin condition due to the increased frictional contact of the tires with the road surface, the operator instinctively and substantially instantaneuously follows the lead of the accelerometer-induced pressure, quickly righting the vehicle. In short, the resisting pressure set up by the accelerometer acts in a direction tending to steer the dirigible wheels to the left, hence the operator being "force" informed, and substantially instantaneously, follows the lead of the accelerometer-induced pressure quickly stabilizing the vehicle.

In the case of a spin caused by ice, extensive over the roadway, the operator of a conventional vehicle may lose entirely his feel of the angular disposition of the dirigible wheels due to the decreased frictional contact of these wheels with the road surface—a situation prone to result in a serious mishap. This cannot happen with a vehicle equipped according to the invention, since the disposition of the dirigible wheels is telegraphed to the operator artificially through the hydraulic circuit. Actually, as has been hereinbefore suggested, the operator may remove his hands from the steering wheel altogether and allow the vehicle to right itself automatically.

The operation of the disclosed apparatus on a left turn is believed obvious from the foregoing. Thus it will be understood that the shaft 10 moves axially downwardly on a left turn against the resistance of the pressure of the fluid above the land 24a and that the power piston on the rightward displacement of the spool 86 of the control valve is forced downwardly to swing the pitman arm 60 to the left (Fig. 1). The accelerometer acts just as in the case of a right turn except that the pendulum, of course, swings oppositely (Fig. 1b) to close off chamber B to the exhaust line and to open chamber A to such line.

It is to be understood that the degree of displacement of the slide block 131 is a function of the turning radius and its speed at which the vehicle is traveling. In the case of minor deviations from a straight course neither chamber may be completely cut off from the exhaust line, yet pressure differentials may develop across the slide block leading to the desired corrections.

I claim:
1. An accelerometer adapted for the purpose described, including casing means confining slide means and delineating a pair of chambers therewith, each said chamber having a fluid inlet and a fluid outlet, means defining an exhaust chamber with which said first chambers normally communicate through passage means in said slide means, valve means operably associated with said slide means, and a pendulum within said casing means and directly connected to said slide means to displace the same whereby due to the action of said valve means the flow of fluid from one of said first-mentioned chambers to said exhaust chamber is restricted or blocked.

2. An accelerometer adapted for the purpose described, including casing means confining slide means and delineating a pair of chambers therewith, each said chamber having a fluid inlet and a fluid outlet, means defining an exhaust chamber with which said first chambers normally communicate through separate passages in said slide means, such communication, with said slide means in normal position, being partially blocked by throttle means coactive with said slide means, and a pendulum directly connected within said casing means to said slide means to displace the same thereby to more completely or completely open one of said passages to said exhaust chamber and to more completely or completely close off the other passage to said exhaust chamber.

3. An accelerometer adapted for the purpose described, including casing means confining a slide block and delineating a pair of chambers therewith, each said chamber having a fluid inlet and a fluid outlet, means defining an exhaust chamber with which said first chambers normally communicate through separate passages in said slide block, such communication, with said slide block in normal position, being partially blocked by throttle means operably associated with said slide block, and a pendulum disposed in said exhaust chamber and operably connected to said slide block to displace the same thereby to more completely or completely open one of said passages to said exhaust chamber and to more completely or completely close off the other of said passages to said exhaust chamber.

4. An accelerometer according to claim 3 where said throttle means is fixed in said casing means and is disposed over the openings of said passages to said exhaust chamber.

References Cited in the file of this patent

UNITED STATES PATENTS

| | | |
|---|---|---|
| 2,110,809 | Murphy | Mar. 8, 1938 |
| 2,492,990 | Hanna | Jan. 3, 1950 |
| 2,684,254 | Goss | July 20, 1954 |
| 2,743,941 | Walker | May 1, 1956 |

FOREIGN PATENTS

| | | |
|---|---|---|
| 518,848 | Great Britain | Mar. 8, 1940 |